United States Patent [19]

Suzuki et al.

[11] Patent Number: 4,981,130
[45] Date of Patent: Jan. 1, 1991

[54] IGNITION SYSTEM AND SELF-HEATING CONTAINER

[75] Inventors: Ryoichi Suzuki, Yokohama; Kunio Yamauchi, Hikone; Choji Kawabata, Tatebayashi; Masaaki Nitobe, Tochigi; Koki Ando, Tokyo, all of Japan

[73] Assignees: Nippon Steel Corporation, Tokyo; Nissin Sholuhin Kabushiki Kaisha, Osaka; Nitto Seiki Co. Ltd., Gunma; Kabushiki Kaisha Bandai, Tokyo, all of Japan

[21] Appl. No.: 482,831

[22] Filed: Feb. 21, 1990

[30] Foreign Application Priority Data

Feb. 22, 1989 [JP] Japan ............................. 1-18901[U]
Jun. 28, 1989 [JP] Japan ............................. 1-74838[U]

[51] Int. Cl.⁵ ............................................. F24J 1/00
[52] U.S. Cl. ..................................... 126/263; 431/276
[58] Field of Search ............... 126/263; 431/273, 275, 431/276

[56] References Cited

U.S. PATENT DOCUMENTS 3,527,201 9/1970 Epstein ............................ 126/263
3,662,741 5/1972 Licher ............................. 126/263
3,743,472 7/1973 Perret .

FOREIGN PATENT DOCUMENTS 244837 11/1987 European Pat. Off. .
52-19358 2/1977 Japan .
62-146427 9/1987 Japan .
63-42089 3/1988 Japan .
WO83/00425 2/1983 PCT Int'l Appl. .
280418 1/1952 Switzerland .
572573 1/1946 United Kingdom .

Primary Examiner—Carroll B. Dority
Attorney, Agent, or Firm—Marshall, O'Toole, Gerstein, Murray & Bicknell

[57] ABSTRACT

An ignition system comprising a metal plate having a pyrogen on one side thereof, a turning shaft journalled by the plate, and a sparking wheel secured to the shaft. A flint is supported by the plate and pressed against the wheel. An opening is formed in the plate adjacent the wheel, and a screen is formed on the plate adjacent the opening. The screen deflects sparks through the opening to the pyrogen, and the screen is preferably angled to efficiently deflect the sparks. The igniter is mounted in a self-heating container for heating food or a liquid.

7 Claims, 4 Drawing Sheets

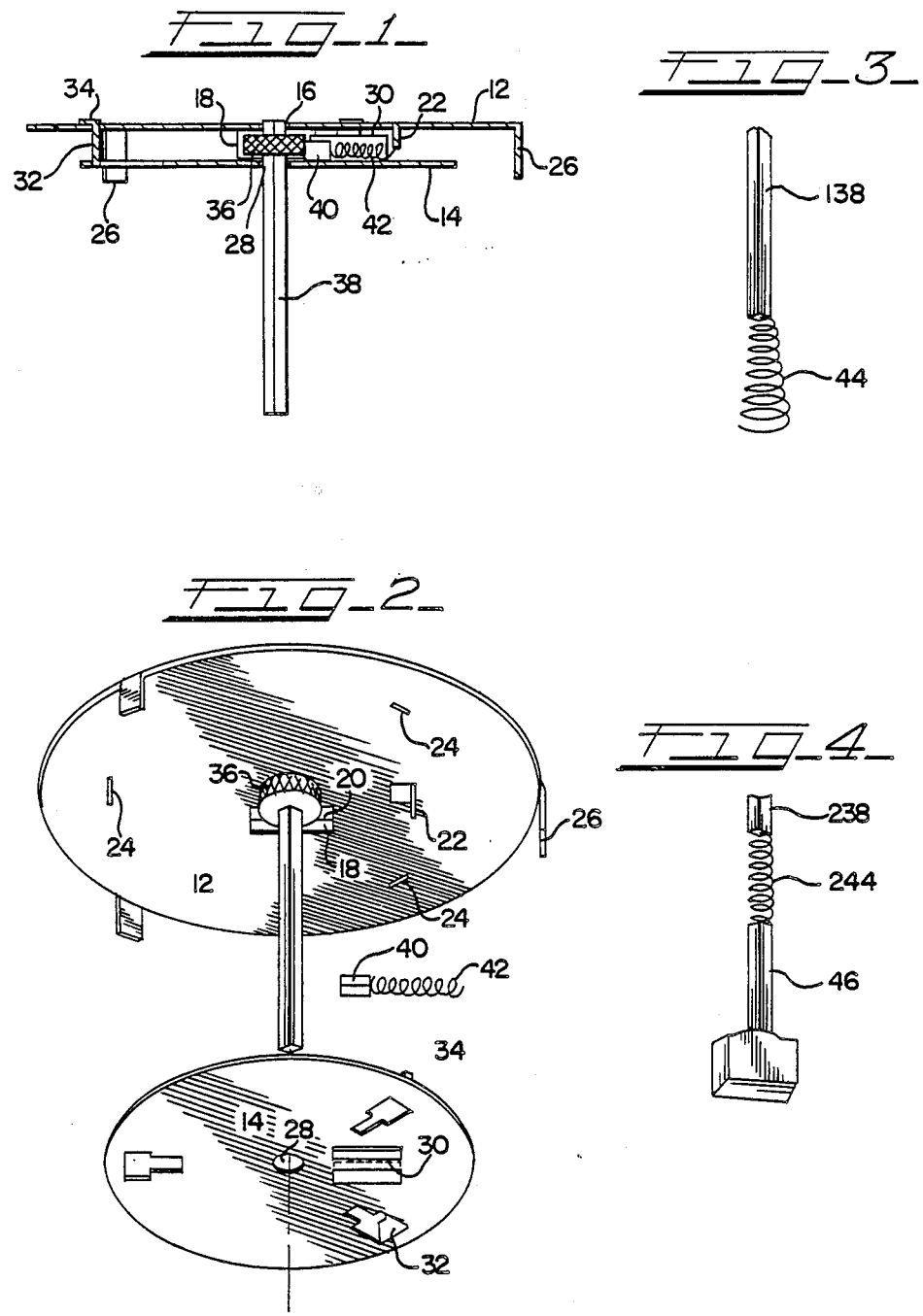

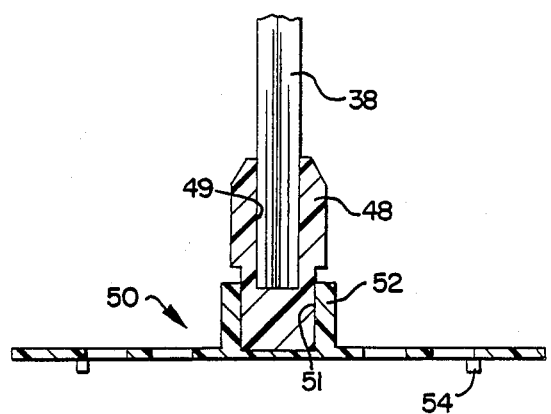
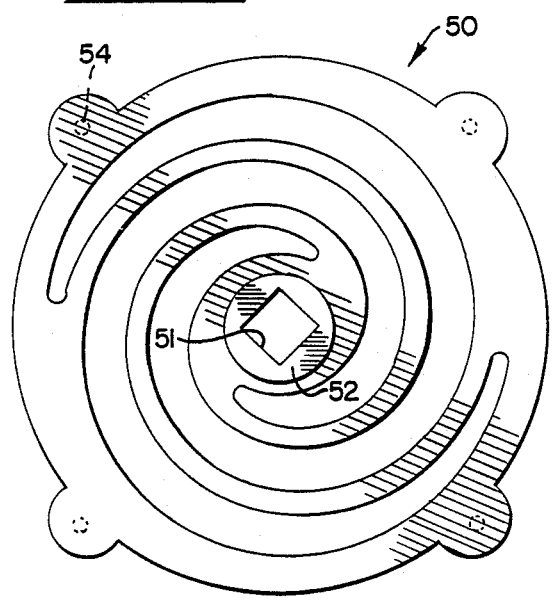

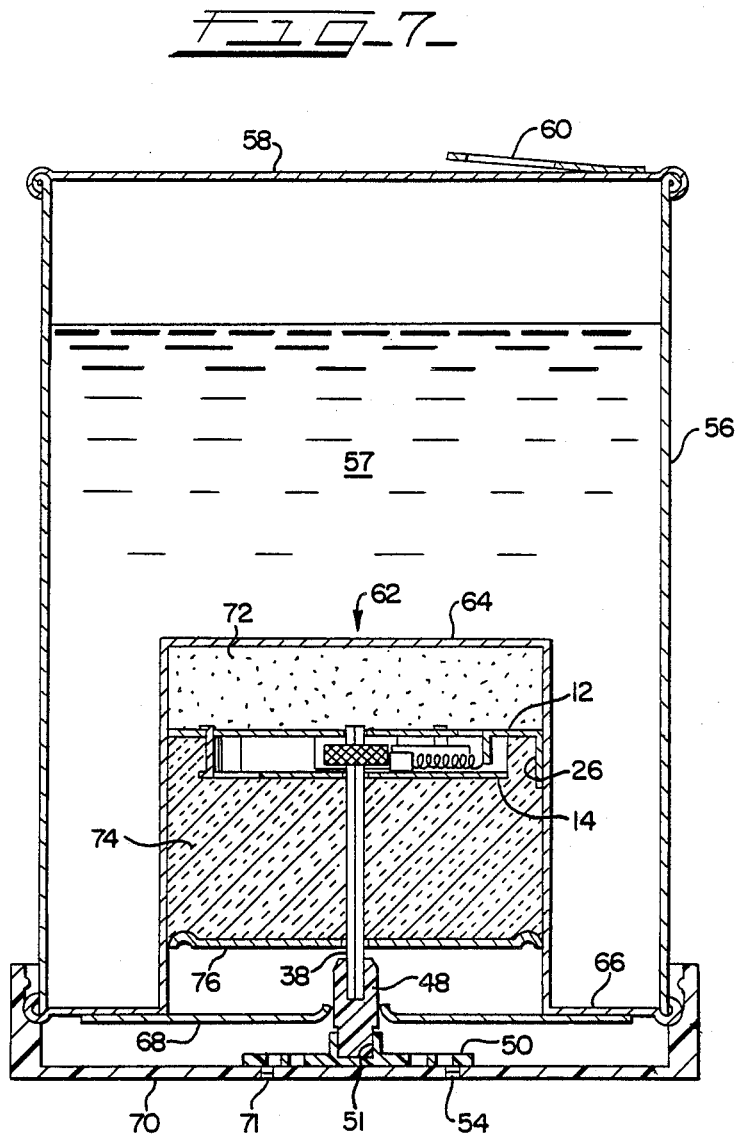

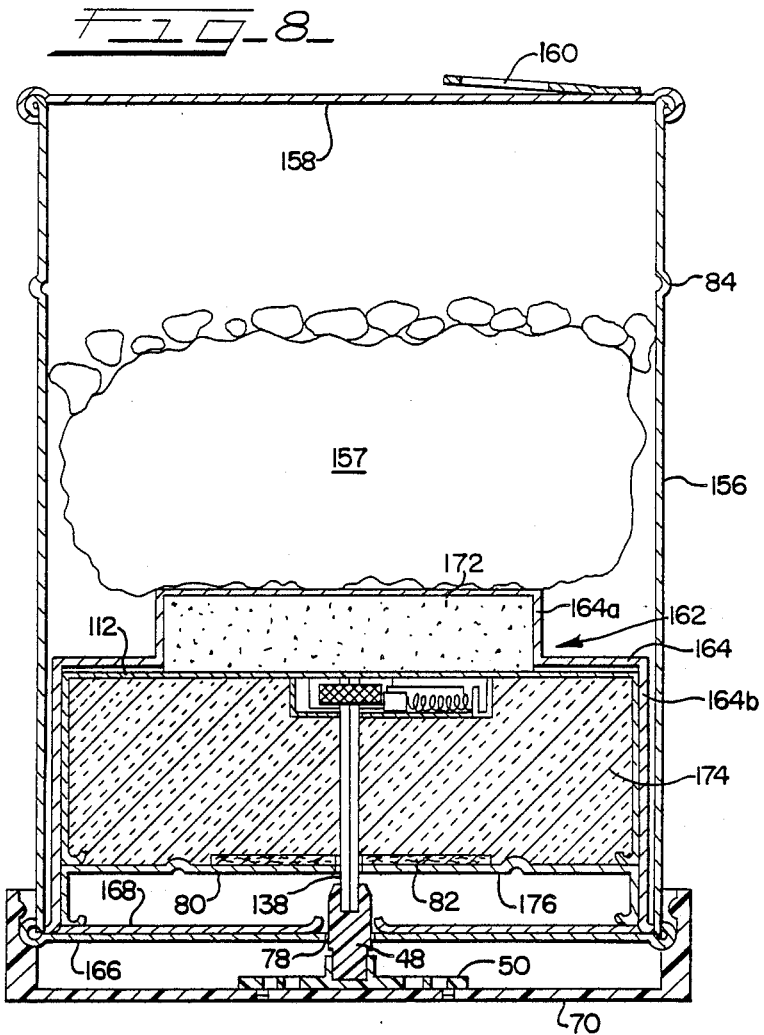
FIG_8_
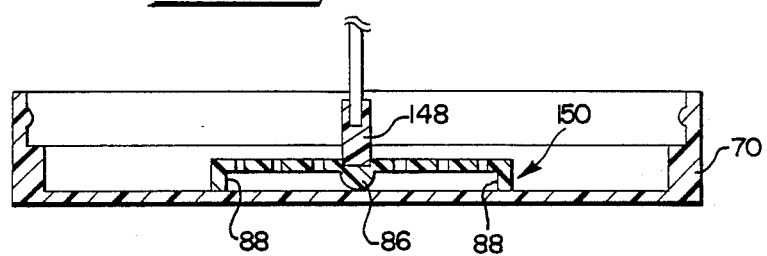
FIG_9_

IGNITION SYSTEM AND SELF-HEATING CONTAINER

FIELD AND BACKGROUND OF THE INVENTION

This invention relates to a container having a heating function and including a pyrogen or self-burning type heat-generating agent. The invention also relates to an ignition system for such a container.

Conventional self-heating containers of this general type are shown in, for example, Japanese utility model publications S.62-146427 and S.63-42089, which show arrangements where the pyrogen is ignited by means of a fuse or a filament-type electric heater. In addition, Japanese patent publication S.52-19358 shows an arrangement for ignition by an electric heater or by a lighter via an ignition hole.

In the conventional ignition methods, ignition was accomplished by a battery, lighter or other ignition means, which was inconvenient to use. Furthermore, a lighter or fuse is difficult to use outdoors during rain or strong winds.

SUMMARY OF THE INVENTION

The present invention seeks to provide an ignition system which can be contained within a self-heating container, for easy and safe ignition without requiring a lighter, battery or the like. Another aspect of the invention is to provide a self-heating container including such an ignition system.

According to a first aspect of the invention, there is provided an ignition system for a self-heating container containing a heater which includes a pyrogen, the ignition system comprising a metal plate adapted for contact on one of its sides with a pyrogen, a turning shaft journalled to the plate, a sparking wheel having an abrasive or rough cylindrical surface and secured coaxially to the shaft on the other side of the plate, a flint supported by the plate and pressed against the abrasive surface to generate sparks when the wheel is caused to rotate, a screen formed on the plate adjacent the abrasive surface and the flint, and an opening formed in the plate adjacent the screen. The screen is preferably angled to deflect sparks towards and through the plate opening to the pyrogen on the opposite side of the plate.

According to a second aspect of the invention, there is provided a self-heating container comprising a cylindrical peripheral wall, and a cylindrical metal casing secured in a lower portion of the container. The casing has an upper zone which accommodates a pyrogen and is substantially smaller in diameter than the remaining lower zone which accommodates an insulator and is slightly smaller in diameter than the container. The casing supports, under the pyrogen, an ignition system as described above.

BRIEF DESCRIPTION OF THE DRAWINGS

The invention will now be described in greater detail by way of example only with reference to the accompanying figures of the drawings, in which:

FIG. 1 is a side view in vertical section of an ignition system constructed in accordance with the invention;

FIG. 2 is an exploded perspective view of the ignition system of FIG. 1;

FIGS. 3 and 4 are perspective views showing alternative constructions of parts of the ignition system;

FIG. 5 is a sectional view of parts of the ignition system;

FIG. 6 is a top plan view of a plastic spring element shown in FIG. 5;

FIG. 7 is a side view in vertical section of a self-heating beverage container according to the invention;

FIG. 8 is a side view in vertical section of a self-heating food container according to the invention; and FIG. 9 is a side view in vertical section of parts of an alternative self-heating beverage container according to the invention.

DETAILED DESCRIPTION OF THE DRAWINGS

With reference to FIGS. 1 and 2, an ignition system according to the invention includes two spaced parallel metal discs 12 and 14. The upper larger disc 12 has a center hole 16, a rectangular tab or screen 18 and a rectangular opening 20. The screen and opening are formed by making three cuts in the disc 12 adjacent the center hole and bending the section enclosed by the cuts. The bent section forms the screen 18 and it extends from the outer longer side of opening 20 downwardly or toward the disc 14 at an angle of about 45 degrees toward the center hole 16.

The disc 12 also is formed with a lug or stopper 22 formed in a similar manner by making three cuts in the disc 12 and bending the cut section downwardly. The disc 12 further has slits 24, and peripheral tongues or tabs 26 bent downwardly for use as will be explained with reference to FIG. 7. The lug or stopper 22 is formed along a radial line of the disc 12 which extends in parallel with the long dimension of the screen 18 and opening 20.

The lower smaller disc 14 has a center hole 28 formed in it, and two parallel holding walls 30 formed by cutting sections in the disc adjacent the center hole and bending the sections upwardly towards the disc 12. The walls 30 extend adjacent and on opposite sides of a radial line of the disc 14.

The lower disc 14 further has spacer tabs 32 formed by cutting the disc 14 and bending the cut sections upwardly. Each spacer tab 32 is formed with a top nail or narrowed section 34, which extends through one of the slits 24 and is bent over in order to secure the discs 12 and 14 together (see FIG. 1). The shoulders formed at the nails 34 form stops in order to space the two discs.

A sparking wheel 36 has an outer cylindrical abrasive or knurled surface and is secured to a shaft 38 near the upper end of the shaft (see FIG. 1). The shaft 38 is square or polygonal (out-of-round) in cross section. The shaft is supported rotatably by the center disc holes 16 and 28 and extends downwardly below the lower disc 14, the wheel 36 being rotatably interposed between the two discs 12 and 14. The wheel 36 has a diameter which is smaller than the long dimension of the screen 18 and opening 20. The lower sides of the wheel 36 and the screen 20 are close to each other.

The two discs are secured together such that the two walls 30 are on opposite sides of the radial line between the wheel 36 and the lug or stopper 22. A flint 40 and a spring 42 (see FIG. 1) are held in the space formed by the discs 12 and 14, the lug 22, the walls 30 and wheel 36. The flint 40 is pressed against the abrasive or knurled surface of the wheel 36 by the spring 42.

In operation, the shaft 38 is rotated clockwise by suitable means as seen from below to generate sparks by the friction between the wheel 36 and the flint 40. Most of the sparks fly off perpendicularly to the axis of wheel 36, and are deflected by the angled screen 18 upwardly to pass through the opening 20 in the upper disc 12.

FIG. 3 shows another embodiment of the ignition system in which a coiled metal spring 44 has one end attached to the lower end of a shaft 138 which is secured to a sparking wheel (not shown) near the upper end of the shaft. When the lower free end of the spring 44 is grasped and even when turned slowly, the shaft 138 will rotate suddenly at some point of time against the friction between the wheel and flint, thus generating a number of large sparks.

FIG. 4 shows a further embodiment in which a shaft 238 is secured to a sparking wheel (not shown) and is coupled through a coiled spring 244 to a handle 46, which can be grasped and turned. The other parts of FIGS. 3 and 4 are similar to those shown in FIGS. 1 and 2.

FIGS. 5 and 6 show a still further embodiment in which the polygonal shaft 38 of FIGS. 1 and 2 has its upper end secured to a sparking wheel (not shown) as previously described. At its lower end the shaft 38 may be inserted into a blind hole 49 of a key 48. The hole 49 has a shape which mates with the shaft 38, and the key 48 has an out-of-round shape. A plastic spring 50 has a hub 52 formed with an upwardly opening hole 51 for engagement with the lower end of key 48. The spring 50 further has peripheral downwardly extending pins 54 for use as will be explained.

FIG. 7 shows a self-heating beverage container in use, which incorporates the ignition system shown in FIGS. 1, 2, 5 and 6. The container includes an outer cylindrical metal can 56 containing liquid beverage 57 and having a top closure 58, which is removable by pulling a pull ring 60.

The container accommodates a heater 62 having a cylindrical metal casing 64, the lower end of which extends outwardly and is secured to the can 56 to form the can base 66. The bottom of heater casing 64 is closed and sealed by aluminum foil 68. The can base 66 and the foil 68 are covered by a plastic bottom cover 70 which snaps on the can base.

The bottom cover 70 has holes 71 in it which are located in fixed engagement with the pins 54 of the plastic spring 50. The key 48 is normally (before actual use) kept apart from the boss hole 51 of spring 50 and the shaft 38.

The heater casing 64 contains a pyrogen 72 at its upper end and above the upper disc 12 of the ignition system. The disc 12 is held within the casing 64 by the tongues 26 which frictionally engage the casing. A heat-insulating material 74 is also contained between the disc 12 and a lower support cover 76 which is pressed into the lower end of the casing 64, except for a space between the discs 12 and 14. The shaft extends rotatably through the material 74 and a center hole of the cover 76.

For operation, the top and bottom covers 58 and 70 are removed. The key 48 is then inserted and secured in the hub hole 51 of the plastic spring 50. The bottom cover 70 is then snapped over the can bottom 66, so that the key 48 presses against and breaks through the foil 68 and engages with the shaft 38 as shown in FIG. 7.

The bottom cover 70 is then rotated clockwise as seen from below with respect to the can 56, so that the wheel 36 rotates and generates sparks which are directed upwardly through the opening 20 by the angled screen 18. The sparks fire the pyrogen 72 to heat the beverage 57.

By normally keeping the key 48 separate from the shaft 38 and the spring 50 boss hole prior to actual operation, accidental or unintended operation of the heater 62 is prevented.

FIG. 8 shows a self-heating food container in actual use, which also incorporates an ignition system substantially as shown in FIGS. 1, 2, 5 and 6. The container includes a can 156 containing dehydrated noodles 157. The can 156 has a pull closure 158 which is removable with a pull ring 160, and it includes a base plate 166 which has a center hole 78 through which the key 48 is passed.

Prior to use, the key 48 is preferably normally placed on top of the food 157 within the can 156 in order to prevent operation of the ignition system before the top closure 158 has been opened and the can 156 has been filled with water.

The can 156 also contains a heater 162 enclosed in a casing 164 made of, for example, tin-plated steel, which is secured to the base plate 166. The bottom of casing 164 is sealed by a sheet of aluminum foil 168 which covers the interior side of the base plate 166, the outer side of which is covered by a plastic bottom cover 70 similar to that as shown in FIG. 7.

The heater casing 164 includes an upper cylindrical portion 164a which encases a self-burning heating material 172, and a lower cylindrical portion 164b which encases the igniter and a heat insulator 174 below the material 172. The material 172 includes a pyrogen which may be composed mainly of siliconiron alloy and ferric oxide, and a firing agent which may be composed of boric acid and ferric oxide. The insulator 174 may be a zeolite which functions also to absorb odor and gas.

In a specific example of the invention, the lower casing portion 164b has a diameter which is approximately 1–4 mm smaller than that of the can 156. The very small space between the cylindrical walls of the can 156 and the lower casing portion 164b helps to prevent the food 157 from falling into the space between them. This helps the consumer to remove essentially all the food from the container during consumption.

The upper casing portion 164a has a diameter about 10–20 mm smaller than that of the lower portion 164b. The additional space between the cylindrical walls of the can 156 and the upper casing portion 164a prevents the can wall from being overheated.

The insulator 174 is supported by a lower support cover 176 having a center hole for the shaft 138 and eccentric holes 80 for gas release. The eccentric holes 80 are covered by a sheet 82, which may be made of ceramic fibers, non-woven cloth or paper, placed on the cover 176 to keep the insulator 174 from falling through the holes 80. The gas may pass through the sheet 82.

The ignition system includes an inverted cup-shaped support 112 which is approximately 0.4 mm thick iron. The support 112 contacts the heater casing 164 so that the heat generated adjacent the top of the ignition system is efficiently conducted to the casing 164.

The operation of this device is substantially the same as that of FIG. 7, except for removing the key 48 from the can 156 and filling the can with water to the level of a bead 84 after removing the top cover 158.

FIG. 9 shows a modified plastic spring 150 having an upper center hole for driving engagement with a key 148. The spring 150 is formed with a hemispherical center boss 86 on its bottom for point contact with the bottom cover 70, and peripheral legs 88 secured to the cover 70. This arrangement minimizes the friction between the spring 150 and the cover 70.

What is claimed is:

1. An ignition system for a self-heating container containing a heater which includes a pyrogen, the ignition system comprising a metal plate adapted for contact on one of its sides with said pyrogen, a shaft journalaled to said plate, a sparking wheel having an abrasive cylindrical surface and secured coaxially to the shaft on the other side of said plate, a flint, and means including said plate supporting said flint pressed against said abrasive surface to generate sparks when said wheel rotates, a screen formed on said plate adjacent said abrasive surface and said flint, and an opening formed in said plate adjacent said screen, said screen deflecting said sparks toward and through the opening to the opposite side of the plate.

2. An ignition system according to claim 1, and further comprising a spring attached to the shaft.

3. An ignition system according to claim 2, and further comprising a key member for coupling with said shaft and said spring.

4. An ignition system according to claim 1, wherein said screen is angled.

5. A self-heating container comprising a cylindrical peripheral wall, a cylindrical metal casing secured in a lower portion of said container, said casing having an upper portion which holds a pyrogen therein and being substantially smaller in diameter than the remaining lower portion, said lower portion holding an insulator therein and being slightly smaller in diameter than said peripheral wall of said container, said casing supporting a metal plate therein under said pyrogen, a shaft journalled by said plate, a sparking wheel having a cylindrical rough surface and secured coaxially to said shaft under said plate, a flint, and means including said plate supporting said flint pressed against said rough surface to generate sparks when said wheel rotates, a screen formed on said plate adjacent said rough surface and said flint, and an opening formed in said plate adjacent said screen, the screen deflecting the sparks toward and through said opening to said pyrogen.

6. A self-heating container according to claim 5, wherein said screen is angled.

7. A self-heating container according to claim 5, and further comprising a spring secured to said shaft.

* * * * *